(12) United States Patent
Arimitsu

(10) Patent No.: US 6,376,955 B1
(45) Date of Patent: Apr. 23, 2002

(54) MOTOR/GENERATOR WITH MULTIPLE ROTORS

(75) Inventor: Minoru Arimitsu, Yokosuka (JP)

(73) Assignee: Nissan Motor, Co., Ltd., Yokohama (JP)

( * ) Notice: Subject to any disclaimer, the term of this patent is extended or adjusted under 35 U.S.C. 154(b) by 0 days.

(21) Appl. No.: 09/670,618

(22) Filed: Sep. 27, 2000

(30) Foreign Application Priority Data

Sep. 28, 1999 (JP) .......................................... 11-274719

(51) Int. Cl.[7] .......................... H02K 16/02; H02K 1/22
(52) U.S. Cl. ....................... 310/114; 310/261; 310/266
(58) Field of Search ................................ 310/750, 108, 310/105, 112, 113, 114, 162, 266; 290/12, 15, 17; 318/140, 141, 148, 151, 153, 432, 434, 798–815

(56) References Cited

U.S. PATENT DOCUMENTS

| 6,049,152 A | * | 4/2000 | Nakano | 310/114 |
| 6,097,118 A | * | 8/2000 | Hull | 310/74 |
| 6,201,331 B1 | * | 3/2001 | Nakano | 310/114 |
| 6,211,597 B1 | * | 4/2001 | Nakano | 310/266 |

FOREIGN PATENT DOCUMENTS

JP 8-340663 12/1996

* cited by examiner

Primary Examiner—Nestor Ramirez
Assistant Examiner—Judson H. Jones
(74) Attorney, Agent, or Firm—Foley & Lardner

(57) ABSTRACT

A first rotor (9) is disposed on an inner side of a first stator (7) provided with a plurality of coils (19). A second rotor (15) is disposed on an inner side of a second stator (13) provided with a plurality of coils (21). The first rotor (9) is provided with a plurality of protruding poles made of a magnetic material not magnetized. The second rotor (15) comprises a magnet provided with a plurality of magnetic poles. The number of the poles of the second rotor (15) is different from the protruding poles of the first rotor (9). The coils (19) of the first stator (7) and the coils (21) of the second stator (13) are connected in series to an inverter (27). The microprocessor (27) calculates a first AC current with which the coils (19) of the first stator (7) generate a rotating magnetic field rotating in synchronism with the first rotor (9), and a second AC current with which the coils (21) of the second stator (13) generate a rotating magnetic field rotating in synchronism with the second rotor (15). The microprocessor (27) controls the inverter (29) to supply a composite current of the first and second alternating currents to the coils (19, 21).

10 Claims, 6 Drawing Sheets

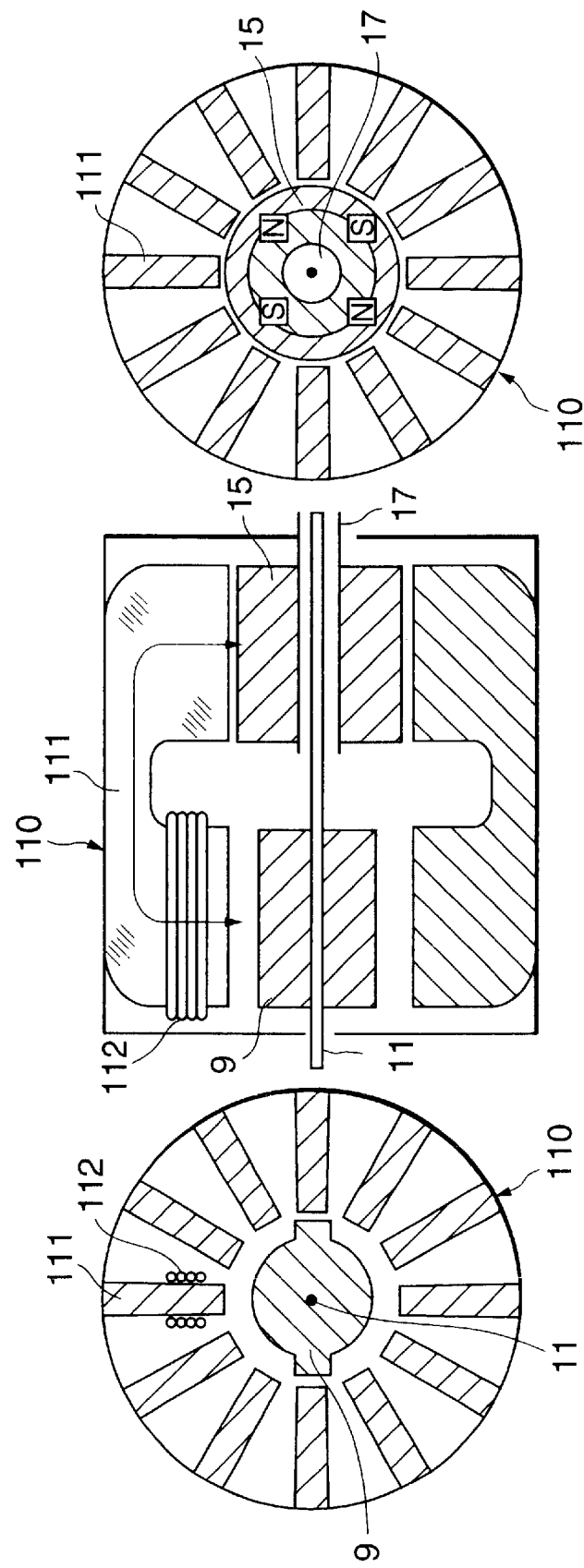

MOTOR/GENERATOR WITH MULTIPLE ROTORS

FIELD OF THE INVENTION

This invention relates to a composite motor which controls the rotation of two motors with a single inverter.

BACKGROUND OF THE INVENTION

Tokkai-Hei-8-340663 published by the Japanese Patent Office in 1996 discloses a motor/generator disposing a single stator and two rotors co-axially.

In this motor/generator, the stator is provided with two groups of coils which are independent on each other Each group of coils generates a rotating magnetic field for each rotor. Under this rotating magnetic field, the rotor rotates in synchronism with the rotating magnetic field. The two rotors are therefore driven independently according to the power currents supplied to these groups of coils.

SUMMARY OF THE INVENTION

In order to supply power currents of different wave forms, the motor/generator has two independent inverters. Accordingly, the construction of the motor/generator is complicated and the switching loss in the inverters is also large.

It is therefore an object of this invention to reduce current loss of a motor/generator provided with two rotors.

It is a further object of this Invention to facilitate current control of a motor/generator provided with two rotors.

It is a still further object of this invention to simplify the construction of a motor/generator provided with two rotors.

In order to achieve the above objects, this invention provides a motor/generator comprising a first rotor, a second rotor, a stator, an inverter and a microprocessor.

The first rotor comprises a plurality of protruding poles made of a magnetic material not magnetized. The second rotor comprises a plurality of poles. The stator comprises a plurality of coils and faces the first rotor and the second rotor. The inverter supplies an alternating current to the coils in response to a signal from the microprocessor.

The microprocessor is programmed calculate a first alternating current with which the coils generate a rotating magnetic field rotating in synchronism with the first rotor, calculate a second alternating current with which the coils generate a rotating magnetic field rotating in synchronism with the second rotor, calculate a composite current comprising the first alternating current and the second alternating current; and output the signal corresponding to the composite current to the inverter.

The details as well as other features and advantages of this invention are set forth in the remainder of the specification and are shown in the accompanying drawings.

BRIEF DESCRIPTION OF THE DRAWINGS

FIGS. 6A–6C are similar to FIGS. 5A–5C, but showing a fourth embodiment of this invention.

DESCRIPTION OF THE PREFERRED EMBODIMENTS

Figure 1A:
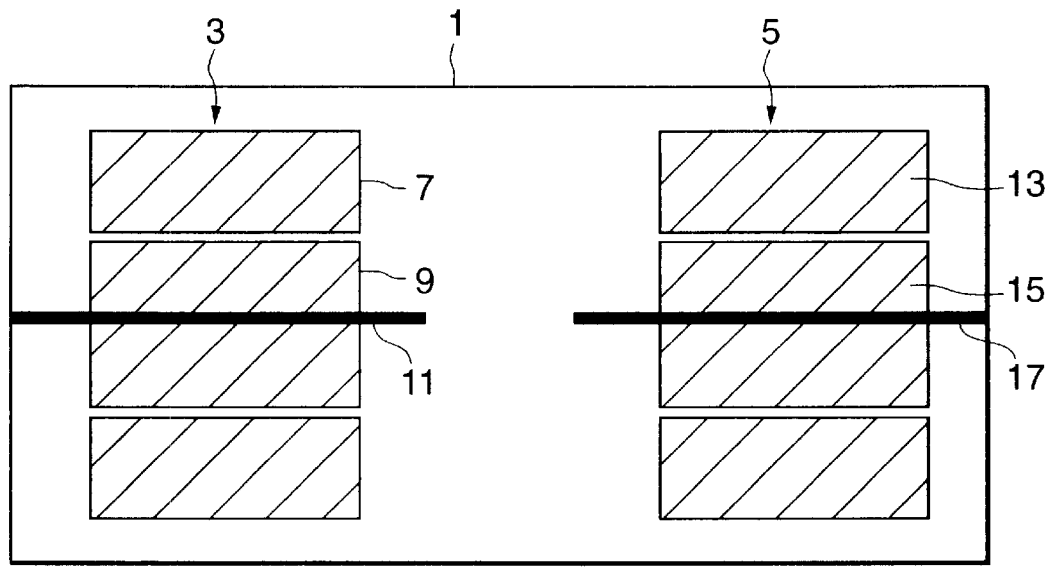
FIGS. 1A and 1B are a schematic longitudinal sectional view and a schematic cross-sectional view of a composite motor according to this invention.
Figure 1B:
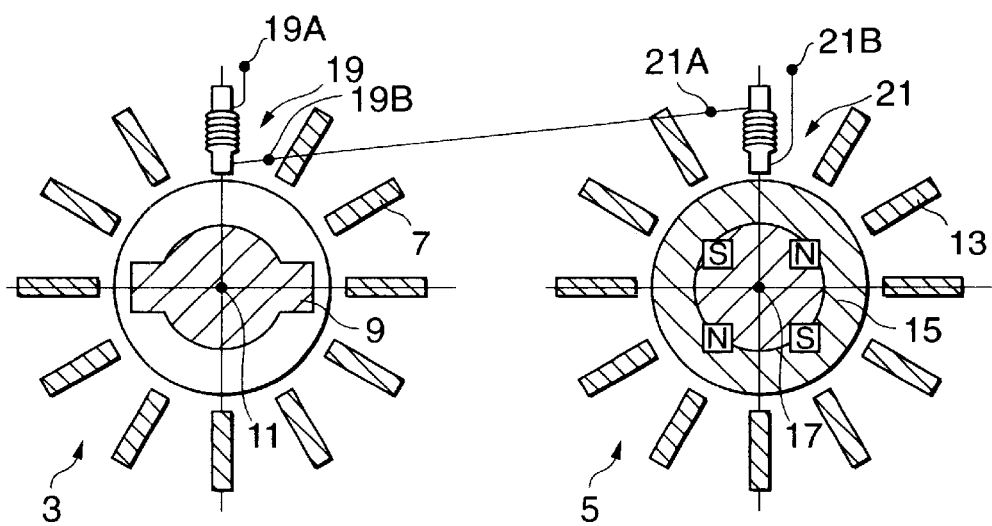

Referring to FIGS. 1A and 1B, a motor according to this invention is provided with a first motor unit 3 and a second motor unit 5 loaded into the same casing 1.

The first motor unit 3 is a reluctance motor comprising a first stator 7 and a first rotor 9. The second motor unit 5 is a synchronized motor comprising a second stator 13 and a second rotor 15.

The first stator 7 and a second stator 13 have the same cylindrical shape. The first rotor 9 is disposed on an inner side of the first stator 7 with a predetermined clearance therefrom. The second rotor 15 is disposed on an inner side of the second stator 13 with a predetermined clearance therefrom. The first and second rotors 9, 15 are disposed co-axially.

The second rotor 15 comprises magnets which provide two N poles and two S poles disposed alternatively at intervals of 90 degrees. As a result, the second rotor 15 has four poles i.e., two pair of poles. In the following explanation, the number of pairs of poles of the second rotor 15 will be represented by a symbol $P_2$.

The first rotor 9 comprises an armature body having two protruding poles. The armature body is not magnetized but is made of a material which conducts magnetic flux. An iron core may be used as the armature body. The first rotor 9 has two poles i.e., a pair of poles. In the following explanation, the number of pairs of poles of the first rotor 9 will be represented by a symbol $P_1$.

The first stator 7 is provided with twelve coils 19. The second stator 13 is also provided with twelve coils 21. Since the number of coils of the first stator 7 and the number of coils of the second stator 13 are identical, they will be represented by the common symbol Ps in the following explanation.

The coils 19 of the first stator 7 generate a rotating magnetic field having a pair of poles by applying a twelve-phase current with a phase difference of 30 degrees.

The coils of the second stator 13 generate a rotating magnetic field having two pairs of poles by applying a six-phase current with a phase difference of 60 degrees.

Figure 2:
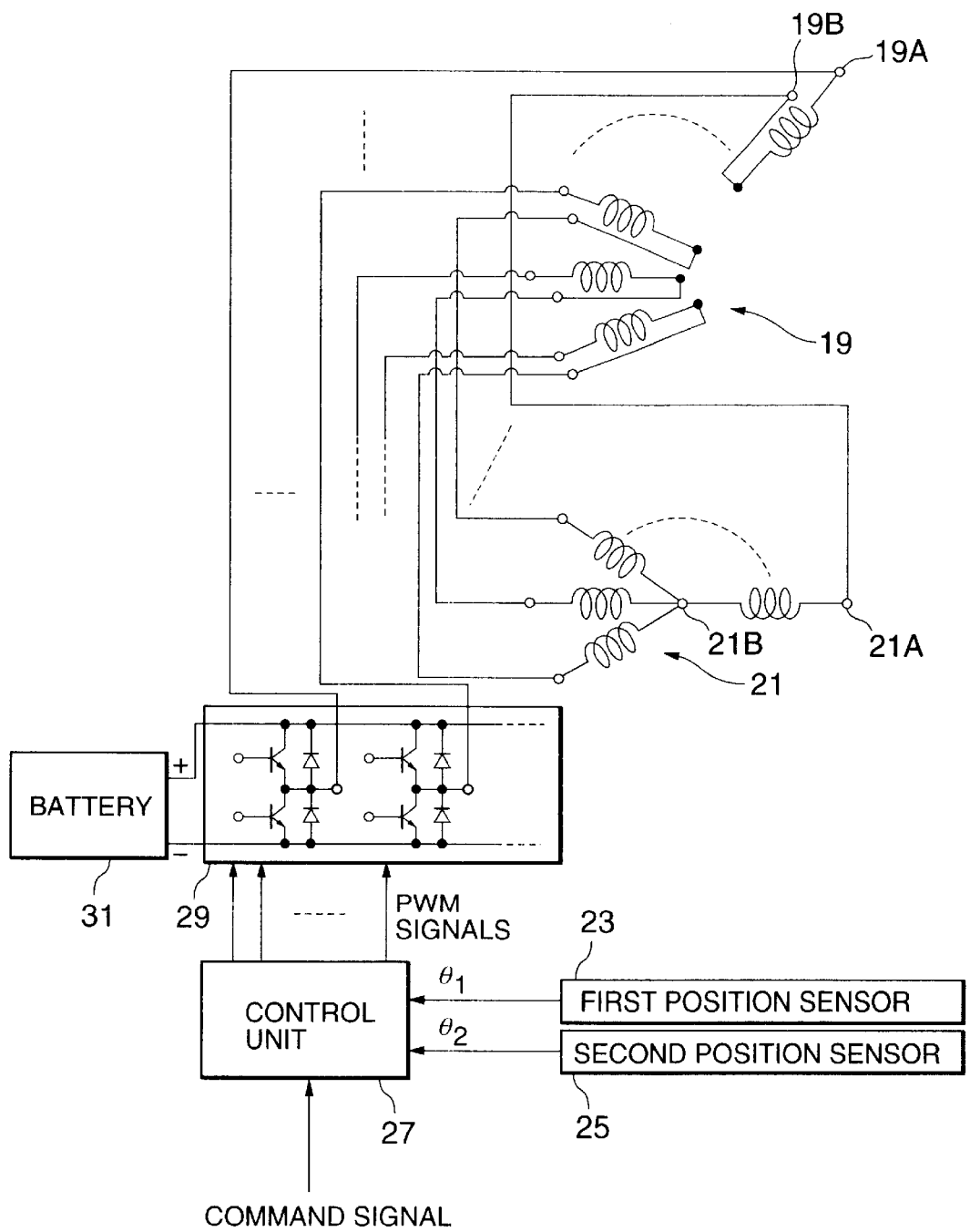
FIG. 2 is a block diagram of a control device for the composite motor.

Referring to FIG. 2, one end 19A of each coil 19 of the first stator 7 is connected with a terminal of the inverter 29. The other end 19 of each coil 19 is connected in series with an end 21A of each coil 21 of the second stator 13 through a cable. The other end of each coil 21 is connected to a terminating point 21B.

The inverter 29 is provided with twelve terminals supplying an AC current to twelve pairs of coils 19 and 21.

The inverter 29 converts a DC current from a battery 31 to AC composite currents $I_0$–$I_{11}$ and outputs them through the twelve terminals.

The sum of the instantaneous current of the composite currents $I_1$–$I_{11}$ is always zero, and thus the current at the terminating point 21B is always zero. The inverter 29 comprises twenty four transistors and the same number of diodes. The inverter 29 may be obtained by modifying a normal three-phase bridge-type inverter into twelve phase. FIG. 2 shows a representative circuit layout of the inverter 29. The signal given to the base of each transistor, that is to say, to each gate of the inverter 29 is a pulse width modulation (PWM) signal comprising ON and OFF signals and is output from the control unit 27.

Signals are input into the control unit 17 from a first position sensor 23 detecting a rotation position $\theta_1$ of the first rotor 9 and a second position sensor 25 detecting a rotation position $\theta_2$ of the second rotor 15. Conmand signals related to the rotational velocity or the output torque of the rotors 9 and 13 are also input into the control unit 27 through an input device, not shown.

The control unit 27 outputs PWM signals so that the first stator 7 forms a rotating magnetic field with respect to the first rotor 9 and the second stator 13 forms a rotating magnetic field with respect to the second rotor 15 based on the command signal and the position signals $\theta_1$ and $\theta_2$. The inverter 29 generates twelve-phase composite AC currents $I_0$–$I_{11}$ with a phase difference of 30 degrees by switching the transistors based on the PWM signals and supplies the currents to the first stator 7 and the second stator 13.

The operation of the control unit 27 will be described in detail below.

A current generally required for the stator coil to generate a rotating magnetic field is expressed by Equation (1).

$$in = Im \cdot \cos\left(\omega \cdot t + \beta - \frac{2 \cdot n \cdot \pi \cdot Ps}{h}\right) \quad (1)$$

where,
- h=number of stator coils,
- n=a natural number satisfying, 0=<n=<h−1, corresponding to a coil number,
- Im=maximum current,
- $\omega$=current frequency (hertz),
- t=elapsed time,
- $\beta$=phase difference, and
- Ps=number of pairs of poles, i.e., ½ of the number of poles of rotating magnetic field.

The self-inductance $L_n$ of each coil 19 of the first stator 7 is expressed by the following Equation (2).

$$L_n = LA + LB \cdot \cos\left\{2 \cdot P_1 \cdot \left(\theta_1 - \frac{2 \cdot n \cdot \pi}{h}\right)\right\} \quad (2)$$
$$= LA + LB \cdot \cos\left(2 \cdot P_1 \cdot \theta_1 - \frac{4 \cdot n \cdot \pi \cdot P_1}{h}\right)$$
$$0 \leq n \leq h-1$$

where, $P_1$=number of pairs of poles of first rotor 9.

Figure 3:
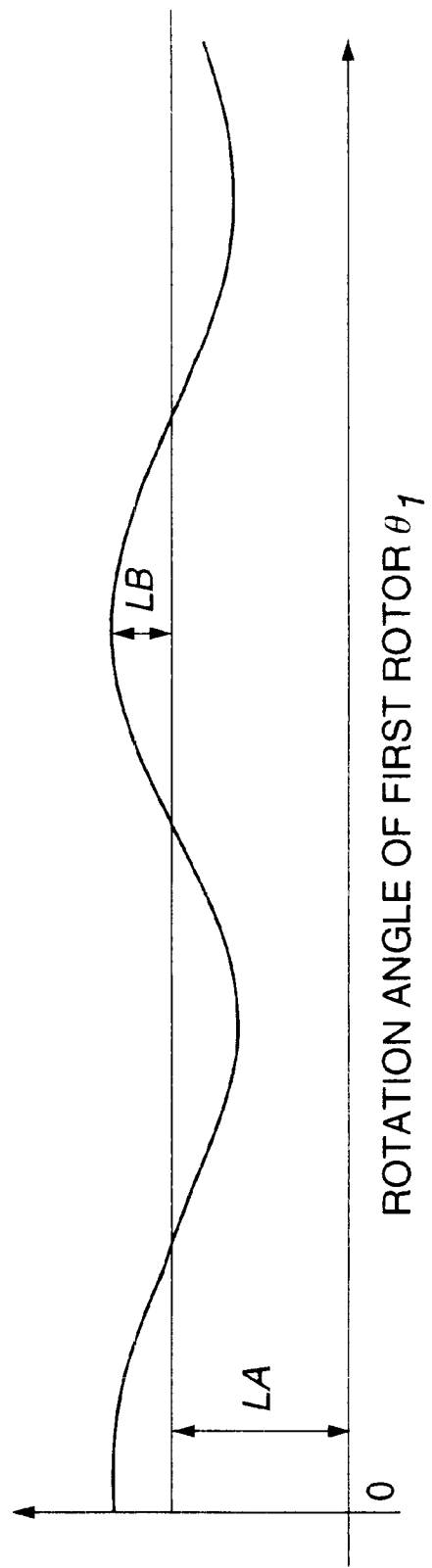
FIG. 3 is a diagram describing self-inductance of a stator coil.

Referring to FIG. 3, LA and LB in Equation (2) represent components of the self-inductance $L_n$. LA is a component unrelated to the rotor position and LB is a component which varies according to the rotation position of the rotor. The flux linkage $\phi_n$ of each coil 21 of the second stator 13 which depends on the magnet of the second rotor 15 is represented by Equation (3).

$$\phi_n = \phi_m \cdot \cos P_2 \cdot \left(\theta_2 - \frac{2 \cdot n \cdot \pi}{h}\right) \quad (3)$$
$$= \phi_m \cdot \cos\left(P_2 \cdot \theta_2 - \frac{2 \cdot n \cdot \pi \cdot P_2}{h}\right)$$

where,
$\phi_m$=maximum flux linkage, and $P_2$=number of pairs of poles of second rotor 15.

Based on Equations (1)–(3), a torque $\tau_2$ (instantaneous torque) applied to the second rotor 15 is calculated by Equation (4).

$$\tau_2 = \sum_{n=0}^{h-1} In \cdot \frac{\partial \phi}{\partial \theta_2} \quad (4)$$
$$= \sum_{n=0}^{h-1} Im \cdot \cos\left(\omega \cdot t + \beta - \frac{2 \cdot n \cdot \pi \cdot Ps}{h}\right) \cdot (-P_2 \cdot \phi_m) \cdot$$
$$\sin\left(P_2 \cdot \theta_2 - \frac{2 \cdot n \cdot \pi \cdot P_2}{h}\right)$$
$$= -P_2 \cdot \phi_m \cdot Im \cdot \sum_{n=0}^{h-1} \frac{\sin\left\{P_2 \cdot \theta_2 + \omega \cdot t + \beta - \frac{2 \cdot n \cdot \pi \cdot (P_2 + Ps)}{h}\right\}}{2} -$$
$$P_2 \cdot \phi_m \cdot Im \cdot \sum_{n=0}^{h-1} \frac{\sin\left\{P_2 \cdot \theta_2 - \omega \cdot t - \beta - \frac{2 \cdot n \cdot \pi \cdot (P_2 - Ps)}{h}\right\}}{2}$$

When the number of poles of the second rotor 15 is set so that the number of coils h of the second stator 13 is equal to a multiple of the number of poles of the second rotor 15, that is to say, mod(h, $2P_2$)=0, Equation (4) can be expressed as Equation (5).

$$\tau_2 = -\frac{P_2 \cdot \phi_m \cdot Im}{2} \cdot \sum_{n=0}^{h-1} \sin\left\{P_2 \cdot \theta_2 - \omega \cdot t - \beta - \frac{2 \cdot n \cdot \pi \cdot (P_2 - Ps)}{h}\right\} \quad (5)$$

Equation (5) can be simplified into Equation (6) by making the current frequency $\omega$ equal to the rotational velocity $\theta_2$ of the second rotor 15, and setting $P_2$=Ps, that is to say, by setting the number of pairs of poles Ps of the rotating magnetic field to be equal to the number of pairs of poles of the second rotor 15.

$$\tau_2 = \frac{P_2 \cdot \phi_m \cdot Im}{2} \cdot h \cdot \sin\beta \quad (6)$$

Now considering the situation $P_2 \neq Ps$, the component in $\Sigma$ of Equation (5) is expressed in Equation (7).

$$\sum \sin\left\{P_2 \cdot \theta_2 - \omega \cdot t - \beta - \frac{4 \cdot n \cdot \pi \cdot (P_2 - Ps)}{h}\right\} \quad (7)$$

For example, when h=12, $P_2$=4, Ps=2, Equation (7) can be rewritten as Equation (8).

$$\sum \sin\left(P_2 \cdot \theta_2 - \omega \cdot t - \beta - \frac{n \cdot \pi}{3}\right) \quad (8)$$
$$0 \leq n \leq 11$$

Equation (8) has a value of zero. Therefore when $P_2 \neq Ps$, $\tau_2$ is zero. That is to say, the torque $\tau_2$ is applied to the second rotor 15 only when the number of pairs of poles Ps of the rotating magnetic field generated by the coils 21 of the second stator 13 is equal to the number of pairs of poles $P_2$ of the second rotor 15.

The torque $\tau_1$ (instantaneous torque) generated by the first rotor 9 is calculated by Equation (9).

$$\tau_1 = \sum_{n=0}^{h-1} I n^2 \frac{\partial L}{\partial \theta_1} \quad (9)$$

$$= \sum_{n=0}^{h-1} Im^2 \cdot \cos^2\left(\omega \cdot t + \beta - \frac{2 \cdot n \cdot \pi \cdot Ps}{h}\right) \cdot (-2 \cdot P_1 \cdot L_2) \cdot$$

$$\sin\left(2 \cdot P_1 \cdot \theta_1 - \frac{4 \cdot n \cdot \pi \cdot P_1}{h}\right)$$

$$= -2 \cdot P_1 \cdot L_2 \cdot Im^2 \cdot \sum_{n=0}^{h-1} \sin\left(2 \cdot P_1 \cdot \theta_1 - \frac{4 \cdot n \cdot \pi \cdot P_1}{h}\right) \cdot$$

$$\frac{1 + \cos\left(2 \cdot \omega \cdot t + 2 \cdot \beta - \frac{4 \cdot n \cdot \pi \cdot Ps}{h}\right)}{2}$$

When the number of poles of the first rotor 9 is set so that the number of coils h of the first stator 7 is equal to a multiple of the number of pairs of poles $P_1$ of the first rotor 9, that is to say, mod(h, $2P_1$)=0, Equation (9) can be expressed as Equation (10).

$$\tau_1 = -2 \cdot P_1 \cdot L_2 \cdot Im^2 \sum_{n=0}^{h-1} \sin\left(2 \cdot P_1 \cdot \theta_1 - \frac{4 \cdot n \cdot \pi \cdot P_1}{h}\right) \cdot \quad (10)$$

$$\cos\left(2 \cdot \omega \cdot t + 2 \cdot \beta - \frac{4 \cdot n \cdot \pi \cdot Ps}{h}\right)$$

$$= -\frac{1}{2} \cdot P_1 \cdot L_2 \cdot Im^2 \sum_{n=0}^{h-1}\left[\sin\left\{2 \cdot P_1 \cdot \theta_1 + 2 \cdot \omega \cdot t + 2\beta - \frac{4 \cdot n \cdot \pi \cdot (P_1 + Ps)}{h}\right\}\right] -$$

$$\frac{1}{2} \cdot P_1 \cdot L_2 \cdot Im^2 \sum_{n=0}^{h-1}\left[\sin\left\{2 \cdot P_1 \cdot \theta_1 - 2 \cdot \omega \cdot t - 2 \cdot \beta - \frac{4 \cdot n \cdot \pi \cdot (P_1 - Ps)}{h}\right\}\right]$$

$$= -\frac{1}{2} \cdot P_1 \cdot L_2 \cdot Im^2 \sum_{n=0}^{h-1} \sin\left(2 \cdot P_1 \cdot \theta_1 - 2 \cdot \omega \cdot t - 2 \cdot \beta - \frac{4 \cdot n \cdot \pi \cdot (P_1 - Ps)}{h}\right)$$

Equation (10) can be simplified into Equation (11) by making the current frequency ω equal to the rotational velocity $\theta_1$ of the first rotor 9, and setting $P_1$=Ps, that is to say, by setting the number of pairs of poles Ps of the rotating magnetic field to be equal to the number of pairs of poles $P_1$ of the first rotor 9.

$$\tau_1 = \frac{P_1 \cdot L_2 \cdot Im^2}{2} \cdot h \cdot \sin 2 \cdot \beta \quad (11)$$

Now considering the situation $P_1 \neq Ps$, the component in Σ of Equation (10) is expressed in Equation (12).

$$\sum \sin\left\{2 \cdot P_1 \cdot \theta_1 - 2 \cdot \omega \cdot t - 2 \cdot \beta - \frac{4 \cdot n \cdot \pi \cdot (P_1 - Ps)}{h}\right\} \quad (12)$$

For example, when h=12, $P_2$=4, Ps=2, Equation (12) can be rewritten as Equation (13).

$$\sum \sin\left(2 \cdot n \cdot \pi - 2 \cdot \omega \cdot t - 2 \cdot \beta - \frac{2 \cdot n \cdot \pi}{3}\right) \quad (13)$$

$$0 \leq n \leq 11$$

Equation (13) has a value of zero. Therefore when $P_1 \neq Ps$, $\tau_1$ is zero. That is to say, the torque $\tau_1$ is applied to the first rotor 9 only when the number of pair of poles Ps of the rotating magnetic field generated by the coils 19 of the first stator 7 is equal to the number of pairs of poles $P_1$ of the first rotor 9.

A composite current $I_n$ comprising the current for the second stator 13 to create the rotating magnetic field which exerts the torque $\tau_2$ on the second rotor 15, and the current for the first stator 7 to create the rotating magnetic field which exerts the torque $\tau_1$ on the first rotor 9, is calculated by Equation (14) based on Equation (1).

$$I_n = Im_1 \cdot \cos\left(\theta_1 \cdot \beta_1 - \frac{2 \cdot n \cdot \pi \cdot P_1}{h}\right) + Im_2 \cdot \cos\left(\theta_2 \cdot \beta_2 - \frac{2 \cdot n \cdot \pi \cdot P_2}{h}\right) \quad (14)$$

where, $Im_1$=maximum current in first stator 7, $\beta_1$=phase difference of current in first stator 7, n=a natural number satisfying 0<n<h−1 corresponding to the coil number, $Im_2$=maximum current in second stator 13, and $\beta_2$=phase difference of current in second stator 13.

The torque $\tau_1$ acting on the first rotor 9 when the composite current $I_n$ is supplied to the first stator 7 is expressed by Equation (15) which substitutes $Im_1$ for Im and $\beta_1$ for β in Equation (11).

$$\tau_1 = \frac{P_1 \cdot L_2 \cdot Im_1^2}{2} \cdot h \cdot \sin 2 \cdot \beta_1 \quad (15)$$

In the same manner, the torque $\tau_2$ acting on the second rotor 15 when the composite current $I_n$ is supplied to the second stator 13 is expressed by Equation (16) which substitutes $Im_2$ for Im and $\beta_2$ for β in Equation (6).

$$\tau_2 = \frac{P_2 \cdot \phi_m \cdot Im_2}{2} \cdot h \cdot \sin \beta_2 \quad (16)$$

Thus torque $\tau_1$ applied by the first stator 7 on the first rotor 9 can be controlled by the phase difference $\beta_1$ of the first term of Equation (14). The torque $\tau_2$ applied by the second stator 13 on the second rotor 15 can be controlled by the phase difference $\beta_2$ of the second term of Equation (14).

Referring now again to FIG. 1, the number of coils h of the first stator 7 and the second stator 13 is twelve, the number of pairs of poles $P_1$ of the first rotor 9 is one and the number of pairs of poles $P_2$ of the second rotor 15 is two.

Thus the torque $\tau_1$ of the first rotor 9 from Equation (15) is expressed by Equation (17) and the torque $\tau_2$ of the second rotor 15 is expressed by Equation (18).

$$\tau_1 = 6 \cdot L_2 \cdot Im_1^2 \cdot \sin 2 \cdot \beta_1 \quad (17)$$

$$\tau_2 = 12 \cdot \phi_m \cdot Im_2 \cdot \sin \beta_2 \quad (18)$$

The control unit 27 determines the phase differences $\beta_1$ and $\beta_2$ based on the torque $\tau_1$ of the first rotor 9 and the torque $\tau_2$ of the second rotor 15 which are determined on the basis of the command signal, and outputs PWM signals to the inverter so that a corresponding composite current $I_n$ is obtained.

As a result, the two motor units 3 and 5 can be rotated independently by applying the composite current $I_n$ generated by the single inverter 29 to the coils 19 of the first stator 7 and the coils 21 of the second stator 13.

In this embodiment, the ratio of the number of poles of the first rotor 9 and the number of poles of the second rotor 15 is set to 1:2. However it is possible to rotate the two rotors independently by applying a composite current at any ratio of number of poles except 1:1.

Thus in comparison with a motor using two inverters, it is possible to suppress various losses specific to the inverter such as switching loss, loss due to the snubber to low levels by this invention.

In this embodiment, a case is explained where the rotors 9 and 15 constitute the motor units.

However, this invention may be applied to a case where two rotors 9 and 15 constitute the generator units.

Furthermore, this invention may also be applied to a case where one rotor serves as a generator for generating power while the other rotor serves as a motor rotating by the generated power.

In this case, energy supplied from the inverter or energy regenerated through the inverter by rotation of the rotor is equal to the difference of the energy driving the motor and the electrical energy generated by the generator. The capacity of the inverter 29 can be reduced since the inverter only needs to regenerate or supply energy equal to this difference.

Figure 4A:
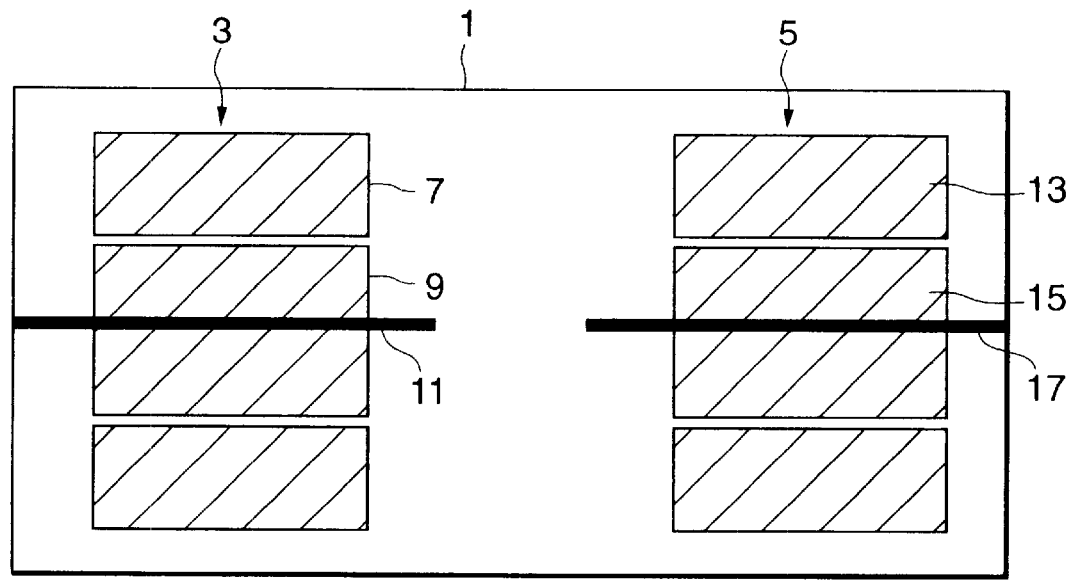
FIG. 4A and FIG. 4B are similar to FIGS. 1A and FIG. 1B, but showing a second embodiment of this invention.
Figure 4B:
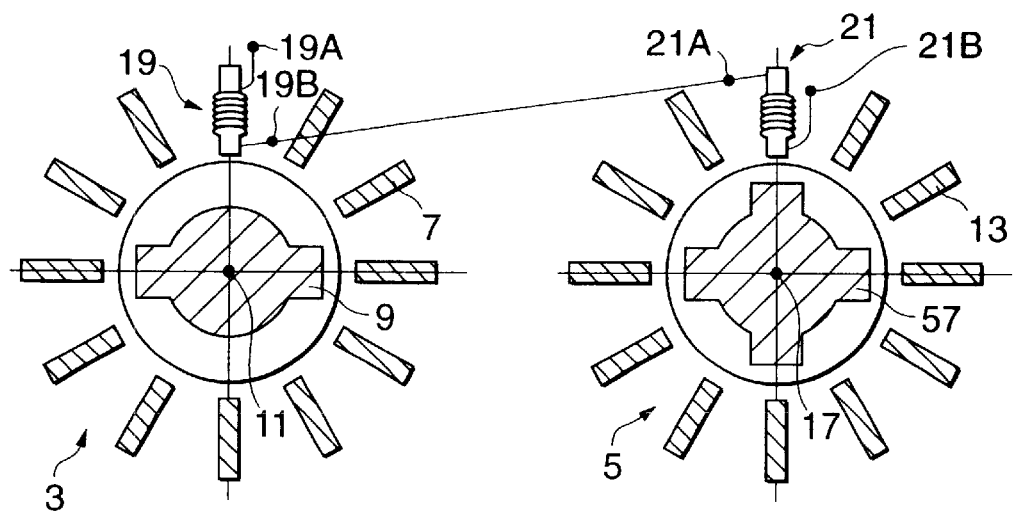

Next, referring to FIGS. 4A and 4B, a second embodiment of this invention will be described.

In this embodiment, a third rotor 57 is used instead of the second rotor 15 of the first embodiment.

The third rotor 57 comprises an armature body with four protruding poles, i.e., two pairs of poles, which is not magnetized but made of a material which conducts magnetic flux.

The second stator 13 generates a rotating magnetic field of which the number of pairs of poles is one by applying a twelve-phase current with a phase difference of 30 degrees in the same manner as the first embodiment. Alternatively, a rotating magnetic field of which the number of pairs of poles is two is generated by applying a six-phase current with a phase difference of 60 degrees.

The principle of the rotational torque that the energized second stator 13 exerts on the third rotor 57 is expressed by Equation (2) which calculates the self-inductance $L_n$.

In this manner, an armature body having a plurality of protruding poles made of a magnetic material not magnetized may be used for both of the two rotors.

Figure 5C:
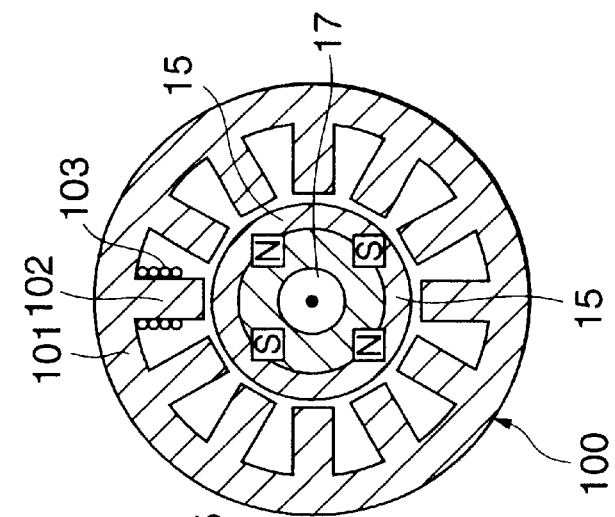
FIGS. 5A–5C are a schematic longitudinal sectional view and a schematic cross-sectional view of a composite motor according to a third embodiment of this invention.
Figure 5B:
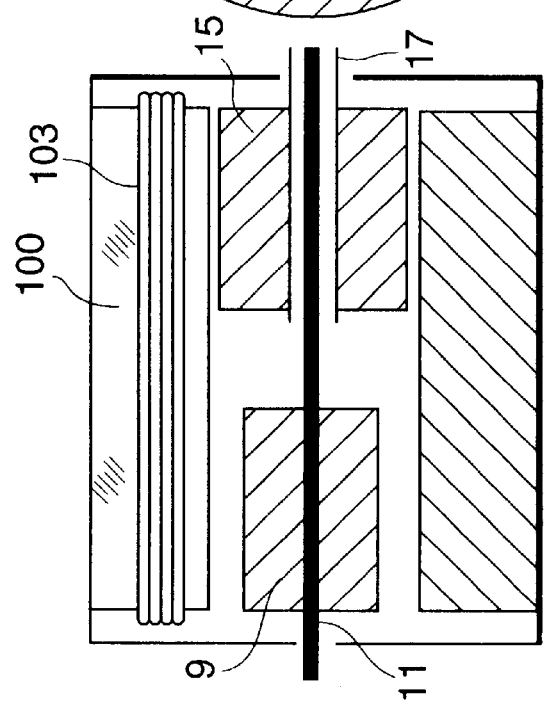
Figure 5A:
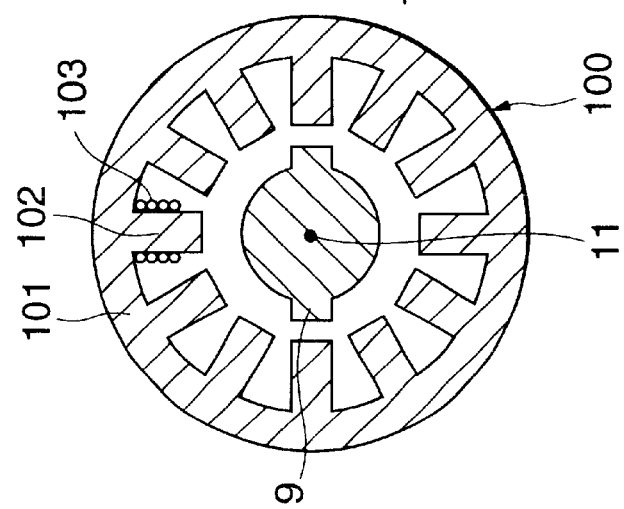

Next, referring to FIGS. 5A–5C, a third embodiment of this invention will be described.

In this embodiment, a single stator 100 is used instead of the first stator 7 and the second stator 13 used in the first embodiment. The stator 100 is provided with a cylindrical body 101 and twelve teeth 102 projecting from the body 101 towards the center. Coils 103 are respectively wound on the teeth 102. The stator 100 is of a length in an axial direction which covers the first rotor 9 and the second rotor 15.

This embodiment also enables independent rotation of the first rotor 9 and the second rotor 15 by controlling a composite current which is supplied to the coils 103 of the stator 100.

Next, referring to FIGS. 6A–6C, a fourth embodiment of this invention will be described.

In this embodiment, a stator 110 of a different shape is used instead of the stator 100 of the third embodiment. The stator 110 is provided with twelve separated cores 111 which are separated in the circumferential direction as shown in FIGS. 6B and 6C. The separated cores 111 have a longitudinal cross section in the shape of a letter "U" as shown in FIG. 9A, with a coil 112 wound on one end facing the first rotor 9. Coils are not wound on the other end facing the second rotor 15.

The magnetic flux generated in response to the current of the coils 112 flows towards the first rotor 9 as shown by the arrow in FIG. 6A and it also flows towards the second rotor 15 via the inner section of the separated cores 111. Thus in this embodiment, it is possible to rotate the first rotor 9 and the second rotor 15 independently by controlling the composite current supplied to the coils 112.

When magnets are used on both the first rotor 9 and the second rotor 15, the concentration of the magnetic flux in the magnet is reduced due to a demagnetization effect that occurs when the same magnetic poles of the two rotors are opposed via the separated cores 111.

This demagnetization effect may cause deterioration in the magnetic properties of the magnet. However, if at least one of the rotors is made of a magnetic material not magnetized as in the above embodiments, deterioration of the magnet due to demagnetization effect can be avoided.

The contents of Tokugan Hei P11-274719, with a filing date of Sep. 28, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A motor/generator comprising:
   a first rotor having a plurality of protruding poles made of a magnetic material not magnetized;
   a second rotor having a plurality of poles;
   a stator facing the first rotor and the second rotor, the stator being provided with a plurality of coils;
   an inverter supplying an alternating current to the coils in response to a signal; and
   a microprocessor programmed to:
      calculate a first alternating current with which the coils generate a rotating magnetic field rotating in synchronism with the first rotor;
      calculate a second alternating current with which the coils generate a rotating magnetic field rotating in synchronism with the second rotor;
      calculate a composite current comprising the first alternating current and the second alternating current; and
      output a signal corresponding to the composite current to the inverter.

2. The motor/generator as defined in claim 1, wherein the second rotor is made of a magnet.

3. The motor/generator as defined in claim 1, wherein the second rotor is made of a magnetic material not magnetized and provided with a plurality of protruding poles.

4. The motor/generator as defined in claim 1, wherein the number of protruding poles of the first rotor differs from the number of poles of the second rotor.

5. The motor/generator as defined in claim 1, wherein the number of the coils of the stator is a multiple of the number of the protruding poles of the first rotor and is a multiple of the number of the poles of the second rotor.

6. The motor/generator as defined in claim 1, wherein the stator is provided with a plurality of separated cores disposed on a circle, each of the cores is provided with one end facing the first rotor and another end facing the second rotor, and the coils are wound on either end of the cores.

7. The motor/generator as defined in claim 1, wherein the stator comprises a first stator provided with a first group of coils facing the first rotor and a second stator provided with a second group of coils facing the second rotor, and the coils of the first group and the coils of the second group are connected in series.

8. The motor/generator as defined in claim 1, wherein the rotating magnetic field generated by the first alternating current has magnetic poles of equal number to the protruding poles of the first rotor and the rotating magnetic field generated by the second alternating current has magnetic poles of equal number to the poles of the second rotor.

9. The motor/generator as defined in claim 1, wherein the motor/generator further comprises a sensor which detects a rotation position of the first rotor, and a sensor which detects a rotation position of the second rotor, and the microprocessor is further programmed to calculate the first alternating current based on the rotating position of the first rotor, and calculate the second alternating current based on the rotating position of the second rotor.

10. A motor/generator comprising:

a first rotor having a plurality of protruding poles made of a magnetic c material not magnetized;

a second rotor having a plurality of poles;

a stator facing the first rotor and the second rotor, the stator being provided with a plurality of coils;

an inverter supplying an alternating current to the coils in response to a signal;

means for calculating a first alternating current with which the coils generate a rotating magnetic field rotating in synchronism with the first rotor;

means f or calculating a second alternating current with which the coils generate a rotating magnetic field rotating in synchronism with the second rotor;

means for calculating a composite current comprising the first alternating current and the second alternating current; and means for outputting a signal corresponding to the composite current to the inverter.

* * * * *